United States Patent

Kurosu et al.

[11] Patent Number: 5,369,742
[45] Date of Patent: Nov. 29, 1994

[54] IMAGE FILE AND RETRIEVING APPARATUS AND METHOD

[75] Inventors: Yasuo Kurosu, Yokosuka; Shuhei Wada, Fujisawa; Yoshihiro Yokoyama, Yokohama; Hidefumi Masuzaki, Hadano, all of Japan

[73] Assignee: Hitachi, Ltd., Tokyo, Japan

[21] Appl. No.: 717,914

[22] Filed: Jun. 20, 1991

[30] Foreign Application Priority Data

Jun. 20, 1990 [JP] Japan ................ 2-159727

[51] Int. Cl.$^5$ ............................ G06F 15/62
[52] U.S. Cl. .................... 395/147; 395/900; 395/934; 395/1; 382/9
[58] Field of Search .......... 395/147, 900, 934, 1, 395/148; 382/9; 364/274.6, 963, 963.1, 963.2, 963.3, 963.4, 963.5

[56] References Cited

U.S. PATENT DOCUMENTS

| | | | |
|---|---|---|---|
| 4,750,209 | 6/1988 | Shimura et al. | 382/9 |
| 4,899,292 | 2/1990 | Montagna et al. | 364/521 |
| 5,020,019 | 5/1991 | Ogawa | 364/900 |
| 5,121,224 | 6/1992 | Ng et al. | 358/462 |
| 5,129,011 | 7/1992 | Nishikawa et al. | 382/9 |
| 5,133,024 | 7/1992 | Froessl | 382/41 |
| 5,159,667 | 10/1992 | Borrey et al. | 395/148 |
| 5,193,122 | 3/1993 | Kowalski et al. | 382/9 |

Primary Examiner—Heather R. Herndon
Assistant Examiner—Joseph Feild
Attorney, Agent, or Firm—Antonelli, Terry, Stout & Kraus

[57] ABSTRACT

An image information file and retrieving apparatus and method wherein information of an image of at least one document having text information and non-text information is inputted and stored together with attribute information of a relationship of at least one of the text information and the non-text information of the at least one document. The stored image information is retrieved in accordance with a retrieval condition indicating a requested relationship between the text information and non-text information. More particularly, a fuzzy weighting function is utilized for retrieval.

12 Claims, 5 Drawing Sheets

TEXT   NON-TEXT

IMAGE FILE AND RETRIEVING APPARATUS AND METHOD

BACKGROUND OF THE INVENTION

The present invention relates to an image file storing and retrieving method and apparatus and, more particularly, to an image storing and retrieving method suitably adapted to an image information storing and retrieving apparatus for retrieving images by use of layout information about document images.

Recently introduced image filing devices are being progressively introduced into automated offices following the introduction of the word processor, personal computer and facsimile machine. The filing device is attracting much attention for its potential for promoting paperless work in clerical and design offices. The image filing apparatus is capable of storing large amounts of image information on optical disks from which necessary information is instantaneously retrieved and printed out. This feature makes the apparatus particularly attractive to—and purchased by—those departments that handle huge quantities of documents. A big challenge for the image filing apparatus is how to efficiently retrieve any desired document from the massive storage inside.

One way to implement effective document retrieval is to use keywords. This method involves adding a keyword to each image, the keyword representing the contents of each image when the data of that image is stored. Later, a desired image is retrieved using the corresponding keyword. Generally, a keyword to be added to an image is an important word that represents the concept of that image. One disadvantage of this method is that because keywords are linguistic by definition, they cannot fully represent pattern characteristics intrinsic to images.

One solution to the above problem is the apparatus disclosed in Japanese Patent Laid-open No. 60-83179. This prior art apparatus achieves image retrieval in accordance with human intuition using line drawings of original images in place of keywords and works as follows. An image to be stored is first read by an input device, the read image being shown on a display unit. The contour of the displayed image is traced manually using a pointing device (e.g., mouse, tablet, etc.). The traced figure is contracted and used as the equivalent of a keyword. Because each contracted figure represents only the extracted characteristic of the corresponding image, it is easy-to distinguish the desired image from other images. And because the traced contours are contracted, a large number of "keywords" may be collectively displayed on the display screen. When one of the contracted figures on the display screen is designated with the pointing device, the corresponding image is read from optical disk for output.

As described, the prior art apparatus defines line drawings or figures as keywords. This allows the operator to use conceptual patterns conforming to his or her intuition as virtual keywords representing images. Thus any desired image is retrieved with relative ease from optical disk storage of large capacity. The devices associated with the above prior art apparatus are also disclosed in Japanese Patent Laid-open Nos. 60-19275, 62-72067 and 62-93757.

The prior art apparatus, as described, allows a line drawing to be extracted upon image entry, the extracted drawing or figure being used as a virtual keyword. Unlike linguistic keywords, these line drawing "keywords" provide image retrieval more in accordance with human intuition.

One disadvantage of the above described prior art is that it takes huge amounts of time to trace manually the contour of each and every image in order to create the corresponding "keyword".

Another disadvantage is that there are collectively displayed all stored line drawing patterns to choose from and the greater number of images stored, the greater amount of time is required to select a desired pattern from the increasingly numerous patterns representing the stored images.

A further disadvantage of the prior art is that because one stored line drawing pattern corresponds only to one original image, other images similar to one selected image cannot be retrieved without selecting the patterns specifically corresponding thereto.

SUMMARY OF THE INVENTION

It is therefore an object of the present invention to provide an image information storing and retrieving apparatus and method capable of storing large amounts of document images and operating on a storing and retrieving method which allows images to be stored and retrieved without consuming much time and which allows humans to retrieve desired images while allowing for ambiguous retrieval conditions in accordance with their intuition.

In carrying out the invention and according to one aspect thereof, there is provided an image information retrieving apparatus enabling extraction of area information about a photo or figure as an non-text area of a document having other areas such as text areas and storing that information along with an image of the document. The apparatus then designates position information about the photo or with respect to the entire image of the document. The position information provides the basis for creating a fuzzy weighting function. The fuzzy weighting function and the stored area information are processed to acquire the convolution therebetween. Finally, the entire image is output in N images in the descending order of their evaluation values based on the convolution.

The fuzzy weighting function for use with the invention is based on what is known as the fuzzy set theory that handles sets without making clear-cut distinction of the boundaries therebetween. A fuzzy set is expressed as follows: Let U be the universal set covering the area in question. A fuzzy subset F within the universal set U is defined by a membership function $\mu F(u)$. The membership function is a function that maps an element "u" of the universal set U to a value 0.1 indicating what may called the degree of belonging to the fuzzy set F. For example, if a set of people whose ages range from 0 to 100 is the universal set, the membership functions of fuzzy sets "young", "middle (aged)" and "old" are defined as follows:

young = $\mu$young(u) = 1/0 + 1/10 + 0.8/20 + 0.3/30;
middle = $\mu$middle(u) = 0.5/30 + 1/40 + 0.5/50;
old = $\mu$old(u) = 0.4/50 + 0.8/60 + 1/70 + 1/80 + 1/90.

As evident from the above example, a 30-year-old person has degrees of belonging of 0.3, 0.5 and 0.0 with respect to The "young", "middle" and "old" sets, respectively. Expanding this concept on a two-dimensional basis provides a fuzzy weighting function. Illustratively, a fuzzy weighting function may be a membership function defined so that its designated position reaches a maximum (I) based on the position information designated upon retrieval. The condition for setting this membership function is a value of 0.1 in inverse proportion to the distance to the designated position being set for 1. That is, the particular function to be selected may be either linear or nonlinear as long as it optimally conforms to the current use environment.

According to another aspect of the invention, there is provided an image information retrieving apparatus which outputs one image having the highest evaluation value in place of the N images.

According to a further aspect of the invention, there is provided an image information retrieving apparatus wherein the above-mentioned device for extracting the area information utilizes density gradients of images.

According to an even further aspect of the invention, there is provided an image information retrieving apparatus wherein non-text position information such as photo or figure position information is language-based information or layout patterns on display.

According to another aspect of the invention, there is provided an image information retrieving apparatus having a device for extracting as non-text information (1) figure information, (2) blank or solid black area information, or (3) character area information, each kind of area information being extracted by utilizing (1) a crossover count per unit area, (2) average density per unit area, or (3) the combination of the density gradient per unit area with the other two factors.

According to a further aspect of the invention, there is provided an image information retrieving apparatus which singly or combined utilizes four kinds of area information.

According to another aspect of the invention, there is provided an image information relieving apparatus which stores image information on optical disks, each disk containing an image data section for storing original images of a document and an index section for storing the relationship of non-text and text information of the document such as the photo or figure area information corresponding to the original images.

These and further objects, features and advantages of the present invention will become more obvious from the following description when taken in connection with the accompanying drawings which show for purposes of illustration only, several embodiments in accordance with the present invention.

DETAILED DESCRIPTION OF THE PREFERRED EMBODIMENTS

Figure 2:
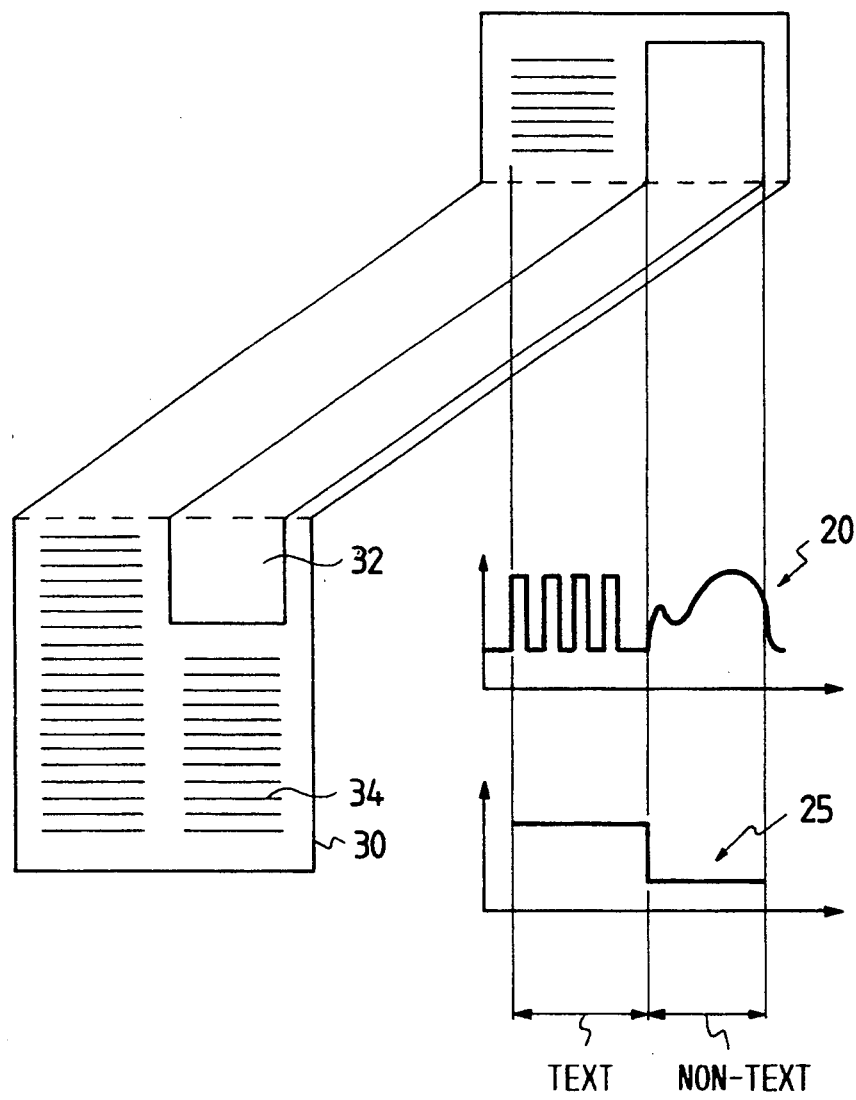
FIG. 2 is a schematic view showing how photo area information is extracted.
Figure 3:
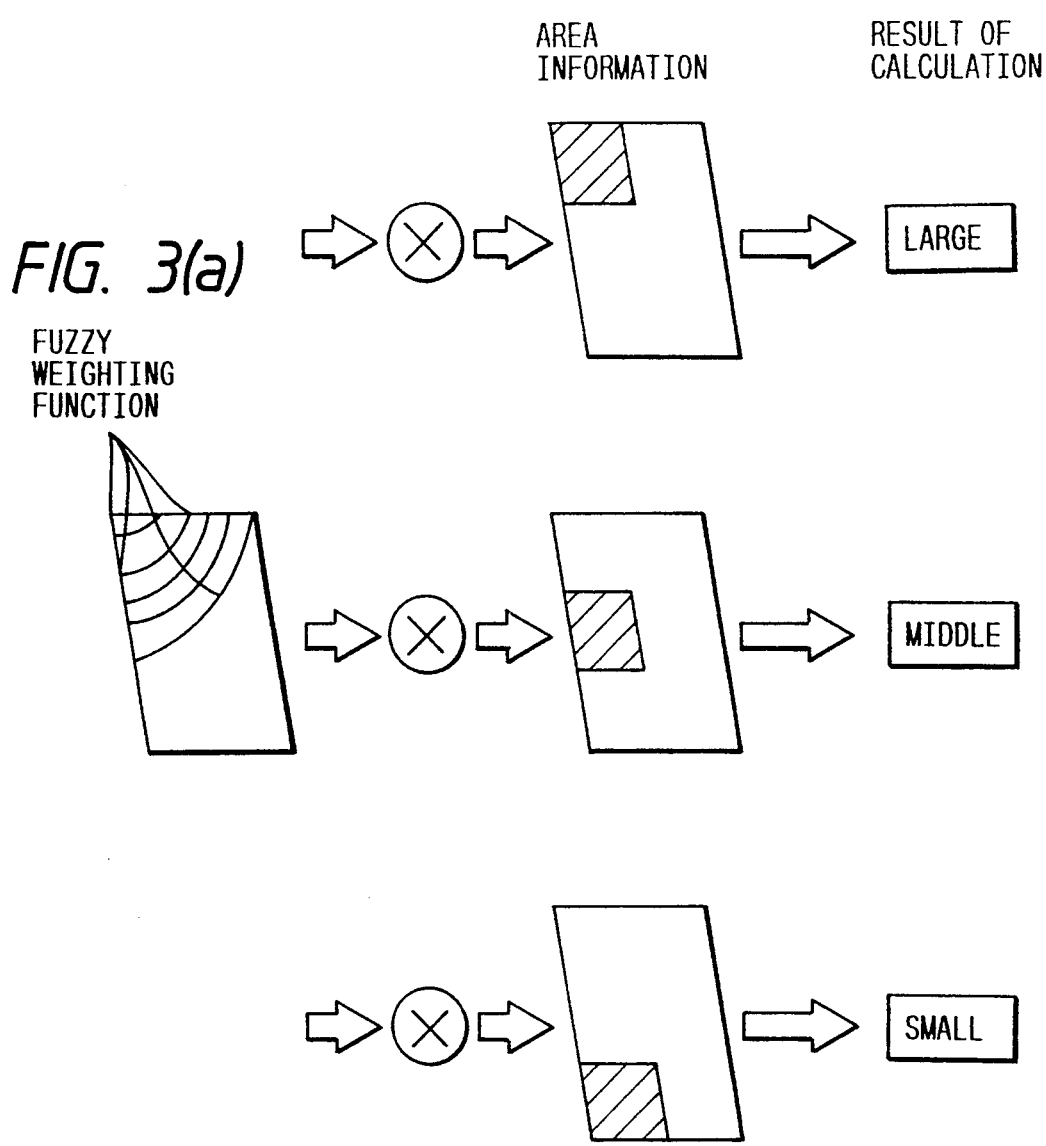
FIGS. 3(a)-3(c) show schematic views illustrating how a fuzzy weighting function is prepared and used in the calculation.
Figure 4:
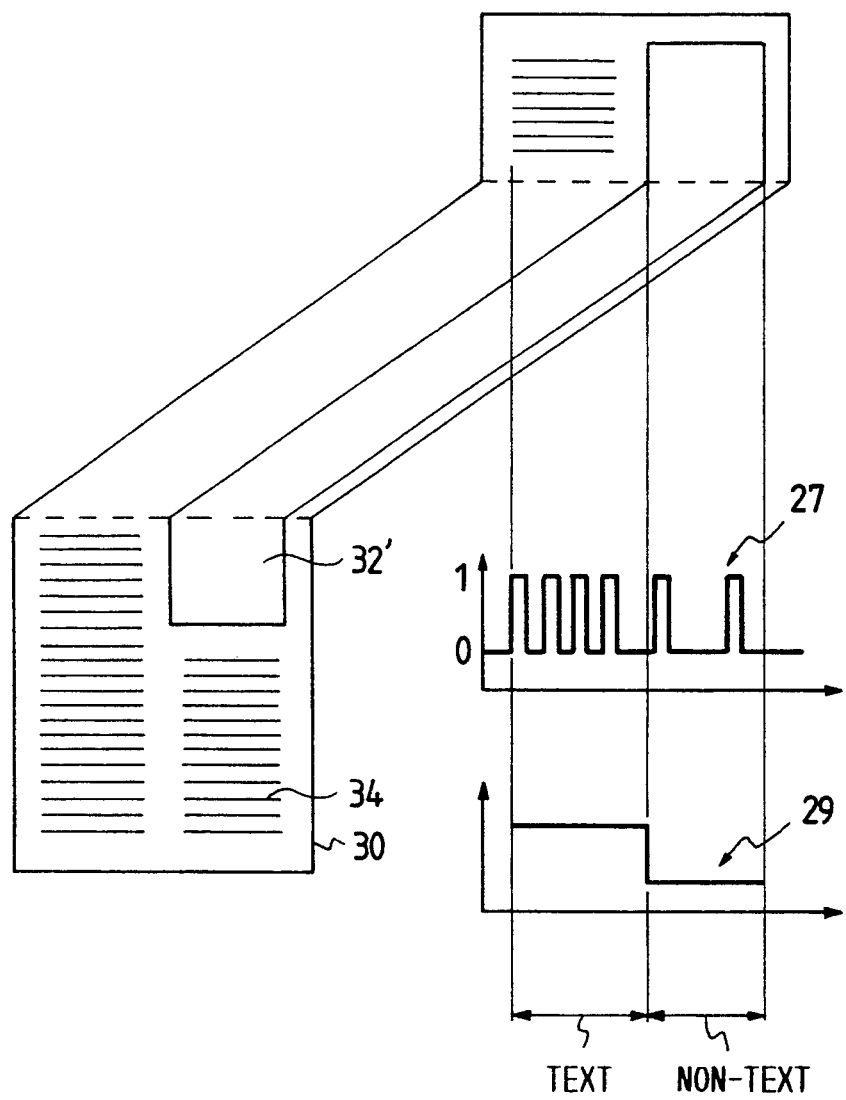
FIG. 4 is a schematic view showing how figure area information is extracted.

Referring now to the drawings, FIGS. 2-4 show the operation enabling filing or storage and retrieval utilizing the image information file and retrieving apparatus in accordance with the present invention.

For storage, images are accommodated in much the same way as with conventional image filing devices. That is, documents are input via a scanner, converted to binary format and stored onto optical disk. Attribute information is stored in the form of information of relationship of text and non-text information so as to obtain layout information from the stored images upon retrieval.

In extracting non-text area information such as photo area information, one property of input images is utilized. That is, images have different density gradients for different attributes. Specifically, photo portions have less steep gradients than character or text portions. In operation, an input image is differentiated and a portion thereof having a low density gradient is judged to be a non-text area such as a photo. The portion judged to be the photo is unified into a block expressed by 1's and 0's before being stored on optical disk.

The manner of processing will now be described with reference to FIG. 2. FIG. 2 shows a density waveform 20 and a density gradient waveform 25 (comprising differential values) applicable to a document 30 containing a non-text area or photo 32 and a text area 34. A portion of the original image of the document 30 shown on the left side of the figure is cut out therefrom across a suitable line, the portion being represented by the corresponding density waveform 20 and differential value waveform 25 depicted on the right side of the figure. As illustrated, the text information such as a character area is indicated by steep changes in density, along with a high differential value or gradient. By contrast, the non-text information or photo area is characterized by gradual changes in density, and the differential value or gradient thereof is correspondingly low. Thus, extracting the area having the low differential value enables automatic extraction of the photo area. As described, no operator intervention is needed when attribute information of the relationship of non-text area to text area of a document or image is to be stored. Without operator participation in the storage process, images may be stored automatically onto optical disk.

The retrieval process may be roughly divided into two phases: the creation of a fuzzy weighting function, and the screening by use of that fuzzy weighting function. Here, the adjective "fuzzy" refers not to logical sets that are either "true" or "false", but to sets that permit intermediate values. For example, in reply to the question of whether a given area of the image is a photo or not (true or false), the answer may be "0.7 true." This is the concept utilized in creating weight functions.

When the position of the desired photo with respect to the text area of a document is identified in this manner, a fuzzy weighting function is created around the photo position, the mask taking a value ranging from 1.0 to 0.0.

The screening process involves calculating the convolution between the area information created upon storage and the above fuzzy weighting function. The closer the position of the photo is to the desired position, the higher the evaluation value thereof derived from the convolution. Thus, if partial images are output to the display unit in the descending order of their evaluation values, the entire image is displayed in the desired layout.

How the fuzzy weighting function is created and the screening thereby is implemented will now be described with reference to FIG. 3. FIG. 3 is a set of views showing how a fuzzy weighting function is related to the area information corresponding to three partial images. FIG. 3(a) depicts how the fuzzy weighting function is created when the image whose layout is shown in the top left corner of the document is desired to be retrieved. An example of a fuzzy weighting function is represented by Fuz $(x,y) = e^{-(x^2+y^2)}$, where x and y are coordinates and are both zero at the top left corner. FIG. 3(b) illustrates the area information representing the partial images of documents whose photo layouts are given in the top left, middle left and bottom left corners of the image of the document. FIG. 3(c) shows how the results of calculating utilizing the fuzzy weighting function on each area information of a stored image of a document in evaluation value terms.

The area information given at the top of FIG. 3(b) involves having the photo positioned precisely where desired. For this reason, the evaluation value as shown in FIG. 3(c) for the area is highest, i.e., large. The area information in the middle of FIGS. 3(b) and 3(c) takes a correspondingly lower evaluation value, i.e., middle. At the bottom of FIGS. 3(b) and 3(c), the evaluation value is lowest, i.e., low. Thus, the shorter the distance of the stored document images from the desired position of the photo on the document, the higher the evaluation value. The retrieved image areas are output in the descending order of their evaluation values.

If the "fuzzy" concept were replaced by normal logic, only the top area information would be true and the rest all false. However, the use of the fuzzy weighting function allows the area information in the middle to be output, retrieval of similar data with room for fuzziness is available.

In the above description, the layout is designated in terms of language. Alternatively, a plurality of layouts to choose from may be displayed on the display screen. Furthermore, while the scheme above uses photos from which to derive area information, a figure, a blank or solid black area or a character or text portion may be used as the basis for providing the area information.

How a figure is processed into area information—a comparatively difficult process—will now be described with reference to FIG. 4. FIG. 4 is similar to FIG. 2 and schematically shows a binary conversion process in connection with a document 30, containing a text area 34 and a non-text area 32', such as a figure, along with the crossover count per unit area of the figure, i.e., the number of zero crossings of a signal of the image.

A portion of the original image of the document shown on the left side of the figure is cut out therefrom across a suitable line, the portion being represented by the corresponding binary cross section and crossover count depicted on the right side of the figure. As depicted, the text or character area is indicated by a high concentration of black and white variable points as represented by the waveform 27, the concentration being matched with a high crossover count of the waveform 29 represented by the value of the number of zero crossings of the waveform 22. By contrast, the non-text or figure area is characterized by a low concentration of variable points, and the crossover count thereof is correspondingly low. Thus extracting the area having the low crossover count per unit area means necessarily extracting the non-text or figure area.

As described, the layout information contained in the document representing the relationship of the text and non-text areas may be used for the retrieval of the latter. It takes only a short time to designate the layout. In addition, other images similar to one particular image may also be retrieved utilizing the fuzzy weighting function. Images are stored on and retrieved from optical disks in the processing procedure outlined above.

Thus, the present invention allows document layout information, which is more compatible with human intuition than words, to be used for image retrieval without requiring long operating hours for storing or retrieving the images. With its advantages including one permitting room for fuzzy retrieval conditions, the present invention is significantly more convenient to use than its predecessors.

Figure 1:
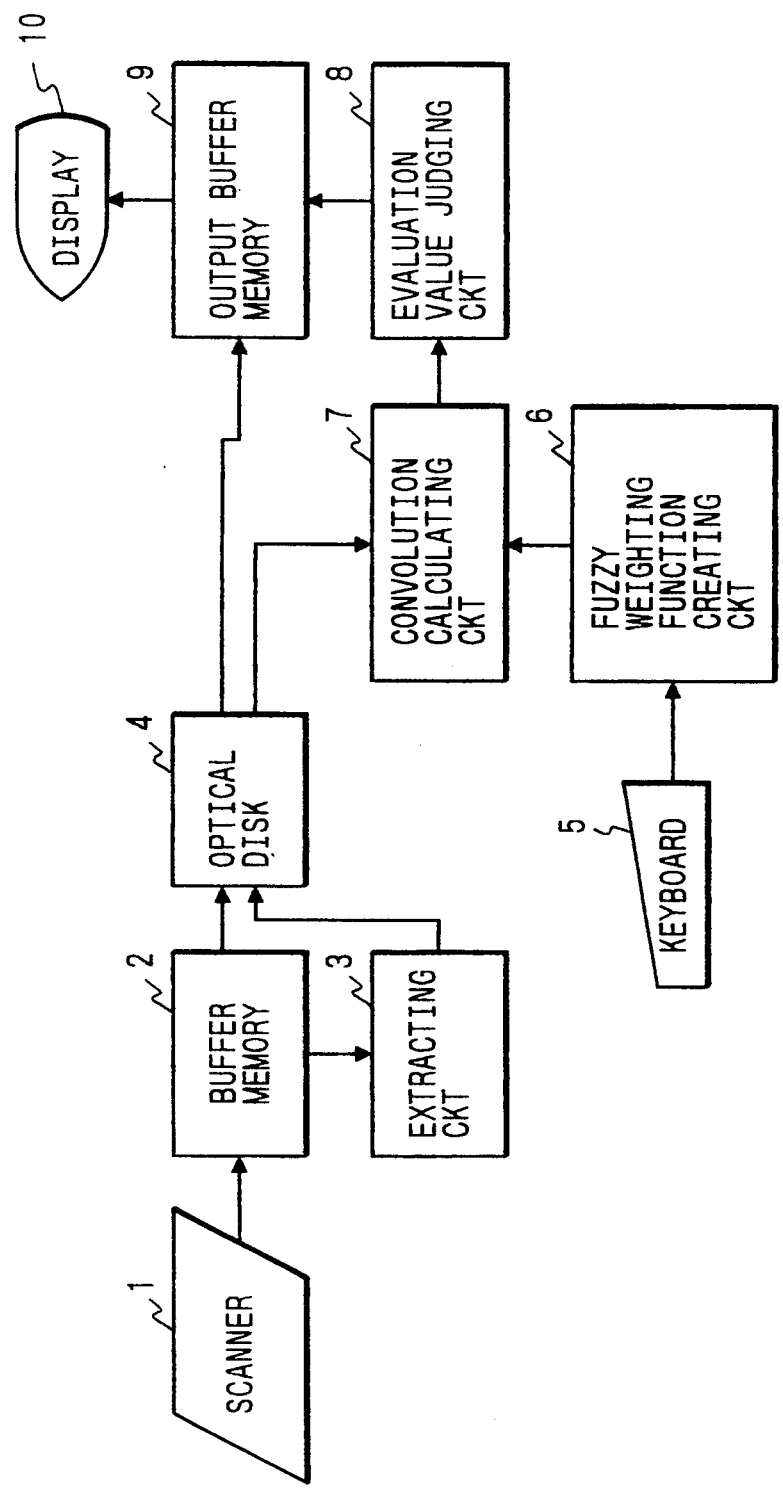
FIG. 1 is a block diagram showing the image file storing and retrieving apparatus according to an embodiment of the present invention.

FIG. 1 is a block diagram of an image information file storing and retrieving apparatus of the present invention which includes a scanner 1 that acquires a digital image of an input document based on an optical image, an input buffer memory 2 that temporarily stores the digital image, a photo area extracting circuit 3 that automatically extracts the position of the photo from the digital image, an optical disk 4 that stores large amounts of image and attribute information, a keyboard 5 for entry of retrieval conditions, a fuzzy weighting function creating circuit 6 that sets a fuzzy weighting function, a convolution calculating circuit 7 that calculates the convolution between the area information and the fuzzy weighting function of an image; an evaluation value judging circuit 8 that selects N evaluation values from the highest down, an output buffer memory 9 that reads out the desired image or images from the optical disk 4 in accordance with the result of the evaluation value judgment, and a display unit 10 that consecutively displays the images being read out.

For storage, the scanner 1 first scans a document optically for the input thereof. The input document is converted to a digital image for input to the input buffer memory 2. After being temporarily stored in the input buffer memory 2, the digital image is output to both the photo area extracting circuit 3 and the optical disk 4 at an appropriate timing. When input to the photo area extracting circuit 3, the digital image is subject to a judging process. In this process, the photo area is extracted from the image according to density gradient differences. That is, each pixel is first differentiated to quantify the density gradient thereof. Then a check is made to see if the pixel falls within the photo area. If the pixel is judged to be inside the photo area, a "1" is set; otherwise a "0" is set. The criterion by which to pass the judgment is a relatively low differential value not close to zero. The proximity to zero is avoided because pixels taking differential values near zero are blank, whereas those taking larger values constitute a character or figure area. Lastly, a majority decision is made on 100×100 pixels which are unified into a block for information compression. The unifying of the pixels compresses the photo area information to about one ten-thousandth of the original image while eliminating noises attributable to inadequate judgments. After being created in this manner, the photo area information is output to the optical disk 4 as attribute information on the input image indicative of the relationship of the text or character information of the document and the non-text or photo area information of the document. The image of the document paired with the attribute information thereof is input to the optical disk 4. On the disk, the image is stored in the image data section, and the attribute information is stored in the index section. When the above storage process is repeated, large amounts of images and attribute information therefor are accumulated on the optical disk 4.

For retrieval, a desired retrieval condition is input through the keyboard 5. For example, if it is desired to retrieve a document image containing a photo in its top right corner, a phrase "top right" is input through the keyboard 5. Of course, the same result is accomplished when various layout patterns are displayed on the display unit and the desired pattern is selected therefrom. The input retrieval condition is output to the fuzzy weighting function creating circuit 6.

After being input to the fuzzy weighting function creating circuit 6, the retrieval condition is analyzed and a fuzzy weighting function is created accordingly. The fuzzy weighting function is a key component which is devised on the basis of fuzzy theory and which is used to execute fuzzy retrieval in accordance with the layout information. FIG. 3(a) illustrates in what shape a fuzzy weighting function is created. For the weighting function, a function is created which converges on 0.0 in inverse proportion to distance, with the desired point set for 1.0. The dimension of the fuzzy weighting function is the same as that of the area information so that convolution calculations may be performed between the fuzzy weighting function and the area information stored. Although an inversely proportional function is utilized with this embodiment, a quadratic curve or an exponential function may be used instead. Flexibility may be sacrificed and only standard fuzzy weighting function patterns may be provided if such practice is acceptable. The fuzzy weighting function thus created is output to the convolution calculating circuit 7.

In addition to the fuzzy weighting function, the convolution calculating circuit 7 admits area information from the optical disk 4. The resulting calculation is carried out as follows:

$$Eve = \sum_{X \cdot Y}^{N \cdot M} Fuz(x, y) \cdot REG(x, y) \quad (1)$$

where, Eve is the evaluation value representing the degree of similarity of the image layout; Fuz(x, y) is the fuzzy weighting function; and REG(x, y) is the photo area information. In response to the fuzzy weighting function created, the area information stored on the optical disk 4 is consecutively read out therefrom. The result of the calculation is output to the evaluation value judging circuit 8. Thereafter, the process is repeated until the area information stored on the optical disk 4 is read out therefrom.

The evaluation values corresponding to the number of the stored images input to the evaluation value judging circuit 8 are sorted in descending order, and the N images having the highest values are selected. The image numbers corresponding to these N values are output to the output buffer memory 9. In accordance with the image numbers input to the output buffer memory 9, the corresponding images are read from the optical disk 4. In the descending order of their evaluation values, the images are displayed on the display unit 10 via the output buffer memory 9. Instead of the N images that are similar to one another, one image having the highest evaluation may be alternatively displayed.

As described, the embodiment of FIG. 1 allows images along which their photo area information to be automatically stored. For retrieval, the fuzzy weighting function of a desired layout and the corresponding area information are calculated for the convolution therebetween so that images are displayed in the descending order of their evaluation values. In this manner, fuzzy image retrieval compatible with human intuition is implemented while the time required for storage and retrieval is reduced. As a result, the man-machine interface of the image filing apparatus is significantly improved. Although the embodiment of FIG. 1 uses photo portions as area information, alternatively, a character, figure or blank portion may be utilized singly or in combination as the area information.

Figure 5:
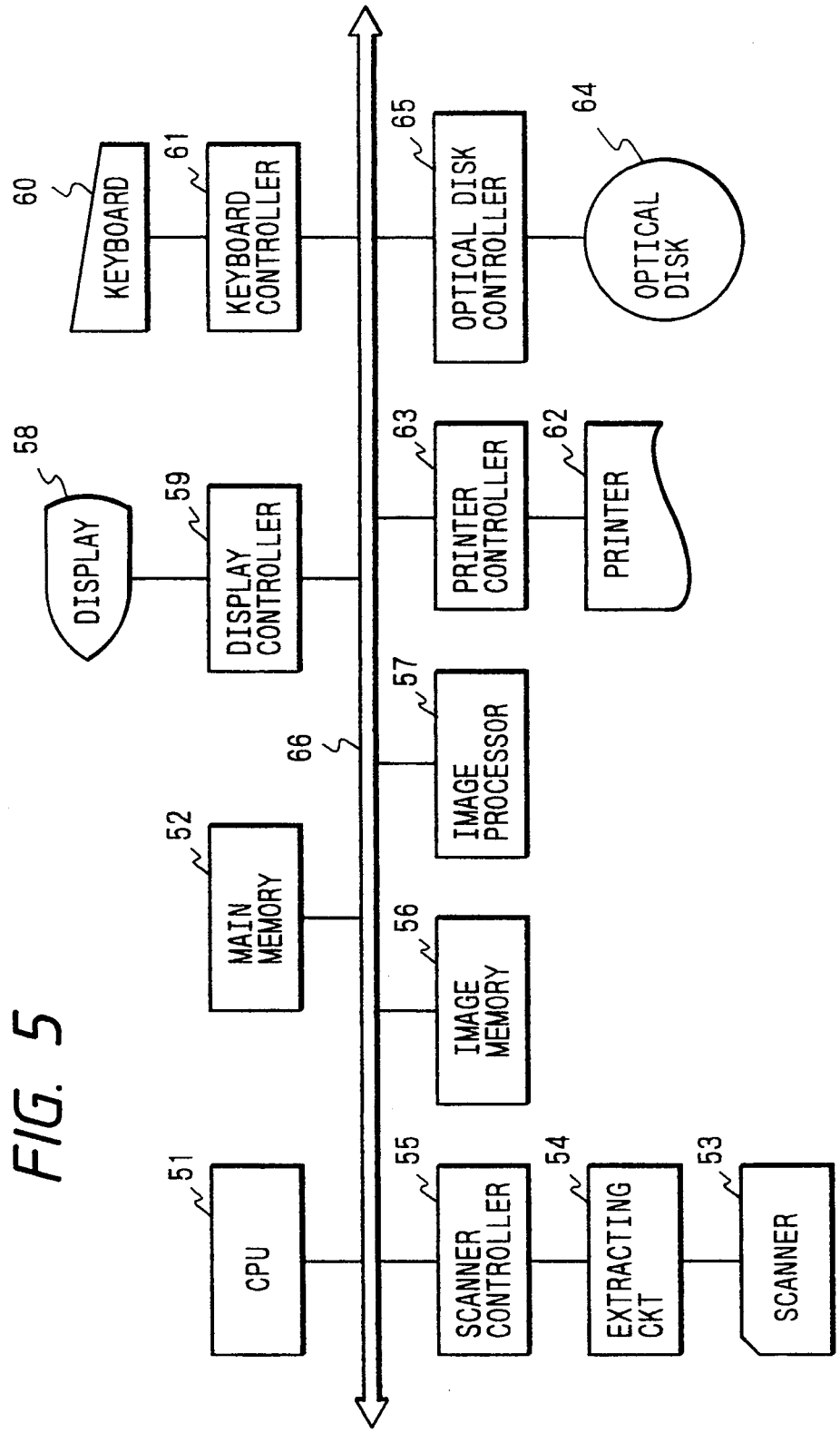
FIG. 5 is a block diagram showing the image file storing and retrieving apparatus according to another embodiment of the present invention.

FIG. 5 is a block diagram of another embodiment of the present invention wherein the construction of the apparatus in FIG. 5 is essentially the same as that in FIG. 1 with the apparatus of FIG. 5 incorporating the concept of program control for higher operational flexibility. In FIG. 5, a CPU 51 (central processing unit) controls the whole apparatus; a main memory 52 contains programs and tables for controlling the CPU 51; a scanner 53 converts documents into electrical image data; a photo area extracting circuit 54 divides the input image data of a document into a non-text area such as a photo area and another area such as a text area; a scanner control circuit 55 generates a scanner driving signal for the transfer of image data and photo area information; an image memory 56 stores the input image data and photo area information; an image processor 57 performs such image handling operations on image data as encoding, decoding, and cut and paste; a display unit 58 displays image data; a display control circuit 59 generates a synchronizing signal and transfers it along with image data to the display unit 58; a keyboard 60 through which an operator enters designating or retrieving condition information, a keyboard control circuit 61 samples designating information from the keyboard 60 and transfers the information to the CPU 51; a printer 62 prints image data on paper; a printer control circuit 63 generates a printer driving signal and transfers image data to the printer; an optical disk 64 stores image data of the document paired with the attribute or photo area information thereabout; and an optical disk control circuit 65 generates an optical disk driving signal for the transfer of image data and photo area information to and from the optical disk.

For storage, the CPU 51 starts the scanner control circuit 55 in accordance with an appropriate program in the main memory 52. When started, the scanner control circuit 55 drives the scanner 53 to input image data. The input image data is sent to the photo area extracting circuit 54 for being subject to a judging process therein. In this process, a photo area is extracted on the basis of density gradient differences. That is, each pixel is first differentiated. If the pixel has a gently sloping gradient, it is judged to be inside the photo area. When a pixel is in the photo area, a "1" is set; otherwise a "0" is set. A majority decision is made on about 100×100 pixels of area information, the pixels being unified into a block for information compression, the block being represented by a single bit. The processed image data and photo area information are stored into the image memory 56 via the scanner control circuit 55 and an image bus 66.

The photo area information stored in the image memory 56 is read therefrom and stored as attribute information about the image data into the index section of the optical disk 64. That is, the photo attribute information is read from the image memory 56, and other attribute information is read from the main memory 52. The two kinds of attribute information are stored where appropriate on the optical disk 64 via the optical disk control circuit 65. The "other" attribute information comprises automatically measurable information such as storage addresses on the optical disk, data lengths, and image data widths and lengths.

Lastly, the image data portion, which is the main body of the image data, is stored onto the optical disk 64. Specifically, the CPU 51 starts the image processor 57. In turn, the image processor 57 converts to encoded data the image data stored in the image memory 56. When encoded according to the MH (Modified Huffman) or M²R (Modified 2 READ) method, the image data is stored in the image data section of the optical disk 64. That is, the encoded data is read from the image memory 56, and stored where appropriate on the optical disk 64 via the optical disk control circuit 65. The above process of image storing operations is repeated every time image data is input. Repeating the process as many times as required accumulates large amounts of image data on the optical disk 64.

For retrieval, the CPU 51 starts the keyboard control circuit 61 in accordance with an appropriate program in the main memory 52. When started, the keyboard control circuit 61 inputs a desired retrieval condition from the keyboard 60. The retrieval condition to be input is the layout information on a photo in a document image. When input, the retrieval condition is stored in the main memory 52. After being stored in the main memory 52, the retrieval condition is analyzed and a fuzzy weighting function is created accordingly. The fuzzy weighting function is a key component which is devised on the basis of fuzzy theory and which is used to execute fuzzy retrieval in accordance with the layout information. The mask has a chevron-shaped curve that converges from 1.0 onto 0.0 centering on the desired photo position. Expressed in fractions, the mask allows for a certain degree of fuzziness. The created fuzzy weighting function is stored in the main memory 52. Equation (1) is executed between the photo area information from the optical disk 64 and the fuzzy weighting function from the main memory 52. Thereafter, the operation of equation (1) is repeated on all the area information stored on the optical disk 64 until the information is exhausted.

After the operation, there is created in the main memory a table which comprises the evaluation values of the respective images and their storage addresses on the optical disk 64. The images are sorted in the descending order of their evaluation values so that the images similar to the designated layout are selected in the order of their similarities. The upper N addresses are reported to the optical disk control circuit 65 via the CPU 65. The compressed image data is read from the optical disk 64 in accordance with the reported addresses and is stored into the image memory 56. After being stored, the encoded data is decoded by the image processor 57 into the original image data. Finally, the decoded image data is displayed on the display unit 58 via the display control circuit 59. The above steps are repeated so as to display the image data on the display until 58 in the descending order of the evaluation values involved. When the desired document image is displayed, the processing is brought to an end.

With the desired document image obtained on the display unit 58, the printer control circuit 63 may be activated as needed to have the printer 62 print out the image on paper.

As described, in accordance with the present invention, the area information needed for image data retrieval is automatically obtained by extracting certain characteristics of images. This feature makes it possible to remove the process of manually extracting a line drawing from each given image. With manual labor eliminated from the data entry and storage steps, fully automated entry and storage of image data may be implemented.

The layout of image attributes is utilized in designating a retrieval condition. This eliminates the time-consuming prior art chores of successively displaying a large number of abstract line drawings to choose from. Because retrieval conditions are designated on the spot, the man-machine interface is significantly improved for retrieval operations.

In addition, the matching of image data based on the fuzzy weighting function concept allows for and utilizes the similarities among images. As opposed to the one-on-one correspondence between a line drawing and images, as with the prior art, this feature allows images of similar layouts to be retrieved. This means that even if the operator has only a vague idea of the necessary layout, a fuzzy condition may be used to retrieve similar images.

While we have shown and described several embodiments in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

What is claimed is:

1. An image information retrieving apparatus comprising:
    means for inputting information of an image of at least one document having text information and non-text information;
    means for storing the image information of the at least one document and for storing attribute information regarding a relationship between at least one of the text information and the non-text information of the at least one document; and
    means for retrieving the stored image information in accordance with a retrieval condition indicating a user requested relationship between the text information and the non-text information;
    wherein the retrieving means includes means for forming a fuzzy value weighting function pertaining to the user requested relationship between the text information and non-text information, means for evaluating stored image information of documents in accordance with the fuzzy value weighting function and providing evaluation values thereof, and means for selecting the stored image information in descending order of evaluation values.

2. An image information retrieving apparatus according to claim 1, wherein the retrieving means further includes means for displaying the selected stored image information.

3. An information retrieving apparatus according to claim 1, wherein the retrieving means further includes means for outputting the selected stored image information represented by the highest evaluation value of the selected stored image information.

4. An image information retrieving method comprising the steps of:

storing image information of at least one document having text information and non-text information and attribute information regarding a relationship of at least between the text information and the non-text information of the at least one document or between the non-text information and the text information of the at least one document; and retrieving the stored image information in accordance with a retrieval condition indicating a user requested relationship at least between the text information and the non-text information or between the non-text information and text information;

wherein the step of retrieving includes forming a fuzzy value weighting function of the user requested relationship between the text information and the non-text information or between the non-text information and the text information, evaluating stored image information of documents in accordance with the fuzzy value weighting function and providing evaluation values thereof, and selecting the stored image information in descending order of evaluation values.

5. An image information retrieving method according to claim 4, wherein the step of retrieving further includes displaying the selected stored image information.

6. An image information retrieving method according to claim 4, wherein the step of retrieving further includes outputting the selected stored image information represented by the highest evaluation value of the selected stored image information.

7. An image file apparatus having means for inputting image data of a document including text information and non-text information data, means for storing the image data and related information to retrieve the input data, means for retrieving the image data from the storing means by using a user inputted retrieval condition, and means for outputting image data in accordance with the means for retrieving, comprising:

means for extracting an area of the text information or the non-text information from the outputted image data as information for retrieving the image date;

means for generating a fuzzy value weighting function based on the layout information;

wherein the means for retrieving includes means for operating in accordance with the area of the information text or the non-text information and the fuzzy value weighting function to obtain a retrieved result of the image; and means for outputting the retrieved result of the image in accordance with the operation of the retrieving means.

8. An image file apparatus according to claim 7, wherein the non-text information is at least one of photo information, figure information, blank information, and solid black information of the image data.

9. An image file apparatus according to claim 7, wherein the fuzzy value weighting function is determined by a function which converges on zero in inverse proportion to distance.

10. An image information retrieving method comprising the steps of:

inputting image data of a document having text information and non-text information;

extracting an area of the text information or the non-text information from the inputted image data for utilization as information to enable retrieval of the image date;

storing the image data and the area information;

designating by a user layout information of the document;

generating a fuzzy value weighting function based on the layout information;

retrieving image data by operating in accordance with the area of text or the non-text information and the fuzzy value weighting function to obtain image data; and outputting the image data in accordance with the retrieving operation.

11. An image information retrieving method according to claim 10, wherein the non-text information is at least one of photo information, figure information, blank information, and solid black information of the image data.

12. An image information retrieving method according to claim 10, wherein the fuzzy area is determined by a function which converges on zero in inverse proportion to distance.

* * * * *